(12) United States Patent
Jeon et al.

(10) Patent No.: US 9,495,130 B2
(45) Date of Patent: Nov. 15, 2016

(54) DATA TRANSMITTER APPARATUS AND METHOD FOR DATA COMMUNICATION USING THE SAME

(71) Applicant: SAMSUNG SDS CO., LTD., Seoul (KR)

(72) Inventors: Joong Bae Jeon, Seoul (KR); Min Woo Song, Seoul (KR)

(73) Assignee: SAMSUNG SDS CO., LTD., Seoul (KR)

( * ) Notice: Subject to any disclaimer, the term of this patent is extended or adjusted under 35 U.S.C. 154(b) by 29 days.

(21) Appl. No.: 14/582,852

(22) Filed: Dec. 24, 2014

(65) Prior Publication Data

US 2016/0117148 A1    Apr. 28, 2016

(30) Foreign Application Priority Data

Oct. 27, 2014    (KR) .................. 10-2014-0146482

(51) Int. Cl.
*G06F 5/14*    (2006.01)
*G06F 13/16*   (2006.01)

(52) U.S. Cl.
CPC ............ *G06F 5/14* (2013.01); *G06F 13/1673* (2013.01); *G06F 2205/126* (2013.01)

(58) Field of Classification Search
CPC .......................... G06F 5/14; G06F 13/1673
See application file for complete search history.

(56) References Cited

U.S. PATENT DOCUMENTS

| 6,430,183 B1 | 8/2002 | Satran et al. | |
| 8,103,788 B1* | 1/2012 | Miranda | G06F 13/385 709/224 |
| 2003/0069939 A1* | 4/2003 | Russell | G06F 15/167 709/214 |
| 2004/0139218 A1* | 7/2004 | Matsushita | H04L 12/66 709/234 |
| 2004/0252709 A1* | 12/2004 | Fineberg | G06F 9/546 370/412 |
| 2005/0190720 A1* | 9/2005 | Miyake | H04L 47/14 370/328 |
| 2014/0169162 A1* | 6/2014 | Romano | H04L 47/25 370/230 |
| 2015/0085647 A1* | 3/2015 | Hu | H04L 47/30 370/228 |

FOREIGN PATENT DOCUMENTS

| WO | 2011136605 A2 | 11/2011 |
| WO | 2013162312 A2 | 10/2013 |

* cited by examiner

*Primary Examiner* — Idriss N Alrobaye
*Assistant Examiner* — Ronald Modo
(74) *Attorney, Agent, or Firm* — Sughrue Mion, PLLC (57) ABSTRACT

Disclosed are a data transmission apparatus and a data communication method using the same. The data transmission apparatus includes a buffer manager configured to generate a transmission buffer pool including a plurality of buffers each having a size corresponding to a size of a transmission packet and manage buffer position information and buffer use status information of the plurality of buffers; a data processor configured to divide data into data blocks each having a predetermined size, and a data transmitter configured to convert each of the data blocks received from the data processor into a plurality of transmission packets and request the buffer manager to allocate a number of buffers corresponding to the number of transmission packets.

18 Claims, 11 Drawing Sheets

| MESSAGE TYPE | BLOCK INDEX | LOST-PACKET INDEX | LOST-PACKET INDEX | ... |

[NACK MESSAGE STRUCTURE]

FIG. 3B

| MESSAGE TYPE | BLOCK INDEX | RECEIVED PACKET INDEX | RECEIVED PACKET INDEX | RECEIVED PACKET INDEX | ... |

[ACK MESSAGE STRUCTURE]

DATA TRANSMITTER APPARATUS AND METHOD FOR DATA COMMUNICATION USING THE SAME

CROSS-REFERENCE TO RELATED APPLICATION

This application claims priority to and the benefit of Korean Patent Application No. 10-2014-0146482, filed on Oct. 27, 2014, the disclosure of which is incorporated herein by reference in its entirety.

BACKGROUND

1. Field

The present disclosure relates to data communication, and more particularly, to a data transmission apparatus and a data communication method using the same.

2. Discussion of Related Art

Computer networks enable communication between many computers. For example, the computer networks include a local area network (LAN), a wide area network (WAN), the Internet, a wireless network, and a hybrid device network. In such computer networks, data may be transmitted as one or more packets.

Generally, data is divided into maximum transmission units (MTUs) in IP layers of a transmitter and a receiver and then transmitted and received. Data processing (for example, compression, encryption, decryption, and the like) is performed in application layers of the transmitter and the receiver before the transmitter transmits data and after the receiver receives data. In this case, if the data processing (for example, compression and encryption) in the application layer is performed in maximum transmission units, overhead caused by the data processing increases. Accordingly, in the application layers of the transmitter and the receiver, the data processing is performed using a buffer having a size greater than the maximum transmission unit.

Here, generally, a transmission buffer of the transmitter has the same size as a reception buffer of the receiver. That is, when the transmission buffer of the transmitter has the size greater than that of the reception buffer of the receiver, excessive data is received by the receiver from the transmitter, thus losing a data packet. In addition, when the transmission buffer of the transmitter has the size less than that of the reception buffer of the receiver, although there is a spare space in the reception buffer of the receiver, data transmission may be stopped until transmission of the data included in the transmission buffer of the transmitter is successfully completed. Accordingly, in general, the transmission buffer of the transmitter has the same size as the reception buffer of the receiver.

SUMMARY

The present disclosure is directed to a data transmitter that may smoothly perform data transmission although including a transmission buffer having a size less than that of a reception buffer of a data receiver and a data communication method using the same.

According to an aspect of the present disclosure, there is provided a data transmission apparatus that includes a buffer manager configured to generate a transmission buffer pool including a plurality of buffers each having a size corresponding to a size of a transmission packet and manage buffer position information and buffer use status information of the plurality of buffers, a data processor configured to divide data into data blocks each having a predetermined size, and a data transmitter configured to convert each of the data blocks received from the data processor into a plurality of transmission packets and request the buffer manager to allocate a number of buffers corresponding to the number of transmission packets, in which the buffer manager refers to the buffer use status information of the buffers according to the buffer allocation request and provides buffer position information of usable buffers to the data transmitter, and wherein the data transmitter stores the plurality of transmission packets using the buffer position information provided by the buffer manager and then transmits the plurality of transmission packets to a data reception apparatus.

The buffers belonging to the transmission buffer pool may have a size equal to a size of a maximum transmission unit (MTU) that is set in a transmission protocol between the data transmission apparatus and the data reception apparatus.

The data transmitter may compare the number of data blocks to be transmitted to the data reception apparatus with the number of buffers usable in a reception buffer of the data reception apparatus and request the buffer manager to allocate buffers.

The data transmitter may store the converted packets in respective buffers corresponding to the buffer position information.

The data transmitter may identify a successfully transmitted packet using an acknowledgement message received from the data reception apparatus and return a buffer corresponding to the successfully transmitted packet to the transmission buffer pool.

The data transmitter may deliver buffer return information of the buffer corresponding to the successfully transmitted packet, and the buffer manager may update buffer use status information of the buffer corresponding to the successfully transmitted packet using the buffer return information.

A capacity of the transmission buffer pool may be smaller than a capacity of a reception buffer of the data reception apparatus.

The buffer manager may allocate buffers having the size corresponding to the size of the transmission packet to the data transmitter in units of a packet according to whether a utilization rate of the transmission buffer pool exceeds a predetermined threshold value.

The data communication may be performed using a connectionless-oriented protocol.

The connectionless-oriented protocol may be a user datagram protocol (UDP).

According to another aspect of the present disclosure, there is provided a data communication method including generating, by a buffer manager of a data transmission apparatus, a transmission buffer pool including a plurality of buffers each having a size corresponding to a size of a transmission packet, dividing, by a data processor of the data transmission apparatus, data into data blocks each having a predetermined size, converting, by a data transmitter, each of the data blocks received from the data processor into a plurality of transmission packets and requesting the buffer manager to allocate a number of buffers corresponding to the number of transmission packets, referring, by the buffer manager, to buffer use status information of the buffers according to the buffer allocation request and providing buffer position information of usable buffers to the data transmitter, storing, by the data transmitter, the plurality of transmission packets in buffers belonging to the transmission buffer pool according to the buffer position information, and transmitting, by the data transmitter, the converted packets to a data reception apparatus.

The buffers belonging to the transmission buffer pool may have a size equal to a size of a maximum transmission unit (MTU) that is set in a transmission protocol between the data transmission apparatus and the data reception apparatus.

The requesting may include comparing the number of data blocks to be transmitted by the data transmitter to the data reception apparatus with the number of buffers usable in a reception buffer of the data reception apparatus and requesting the buffer manager to allocate buffers.

The data communication method may further include, after transmitting the converted packets to the data reception apparatus, identifying, by the data transmitter, a successfully transmitted packet using an acknowledgement message received from the data reception apparatus and returning a buffer corresponding to the successfully transmitted packet to the transmission buffer pool.

The returning may include delivering, by the data transmitter, buffer return information of the buffer corresponding to the successfully transmitted packet to the buffer manager, and the data communication method may further include, after the returning, updating, by the buffer manager, buffer use status information of the buffer corresponding to the successfully transmitted packet using the buffer return information.

A capacity of the transmission buffer pool may be smaller than a capacity of a reception buffer of the data reception apparatus.

The providing of the buffer position information to the data transmitter may include allocating buffers having the size corresponding to the size of the transmission packet to the data transmitter in units of a packet according to whether a utilization rate of the transmission buffer pool exceeds a predetermined threshold value.

According to still another aspect of the present disclosure, there is provided a computer program stored in a recording medium and configured to execute a method in combination with hardware, the method including generating a transmission buffer pool including a plurality of buffers each having a size corresponding to a size of a transmission packet, dividing data into data blocks each having a predetermined size, converting each of the data blocks into a plurality of transmission packets and requesting a buffer manager to allocate a number of buffers corresponding to the number of transmission packets, referring to buffer use status information of the buffers according to the buffer allocation request and providing buffer position information of usable buffers to a data transmitter, and storing the plurality of transmission packets using the buffer position information.

BRIEF DESCRIPTION OF THE DRAWINGS

The above and other objects, features and advantages of the present disclosure will become more apparent to those of ordinary skill in the art by describing in detail exemplary embodiments thereof with reference to the accompanying drawings, in which.

DETAILED DESCRIPTION OF EXEMPLARY EMBODIMENTS

Hereinafter, embodiments of the present disclosure will be described in detail with reference to the accompanying drawings. However, this is merely exemplary, and the present disclosure is not limited thereto.

In describing the present disclosure, if a detailed description of known techniques associated with the present disclosure may unnecessarily obscure the gist of the present disclosure, it is determined that the detailed description thereof will be omitted. Also, the terms described below are defined with consideration of the functions in the present disclosure, and thus may vary depending on a user, intention of an operator, or custom. Accordingly, the definition would be made on the basis of the whole specification.

The technical scope of the present disclosure is defined by the claims, and the following embodiments are intended only to explain the technical scope of the present disclosure to those who skilled in the art.

Figure 1:
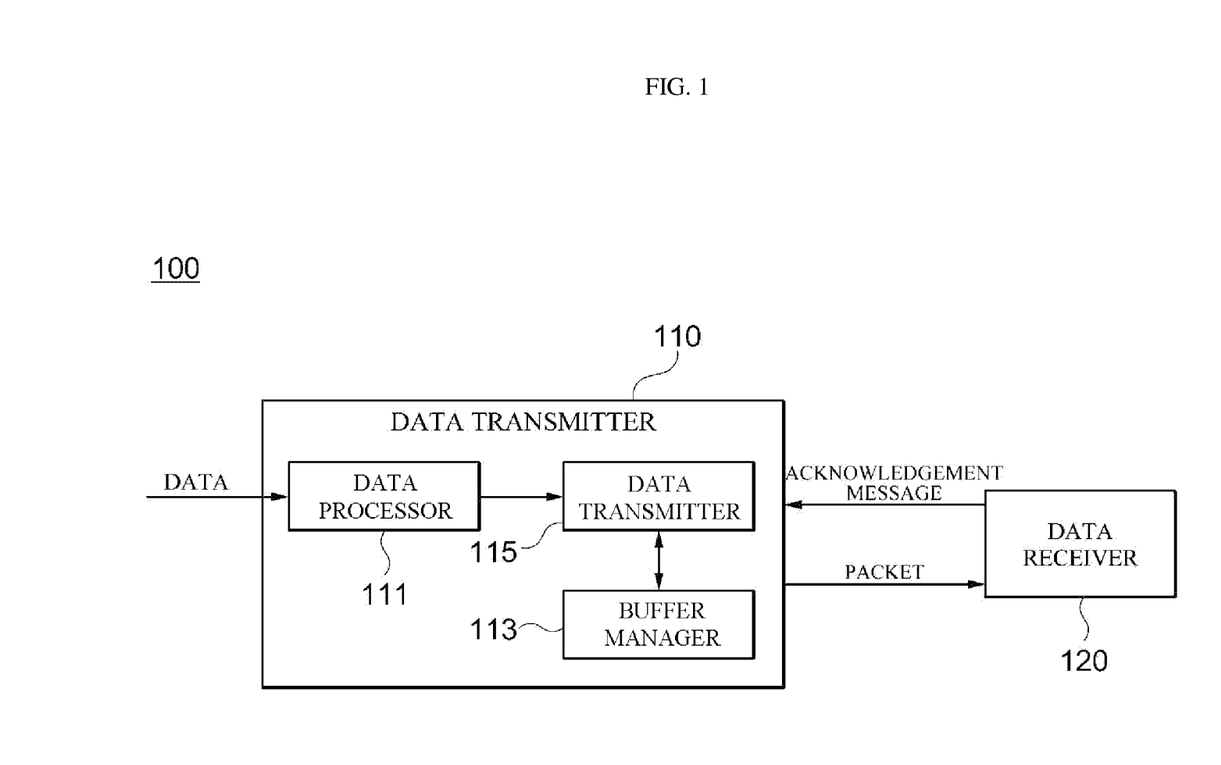
FIG. 1 is a view showing a data communication system according to an embodiment of the present disclosure.

FIG. 1 is a view showing a data communication system according to an embodiment of the present disclosure.

Referring to FIG. 1, the data communication system 100 includes a data transmitter 110 and a data receiver 120. The data transmitter 110 may be configured to transmit data using a connectionless-oriented protocol. The data receiver 120 may be configured to receive data that is transmitted using the connectionless-oriented protocol. The connectionless-oriented protocol that is used in the data communication system 100 may be a user datagram protocol (UDP).

The data transmitter 110 includes a data processor 111, a buffer manager 113, and a data transmitter 115.

The data processor 111 may read a file (that is, data) stored in a memory (not shown) of the data transmitter 110 and divide the file into units of a predetermined data block. The data processor 111 may deliver the data that is divided into units of a data block to the data transmitter 115. The data processor 111 may compress and encrypt the data that is divided into units of a data block when necessary, and may deliver the compressed and encrypted data to the data transmitter 115. The data block has a capacity greater than a size of a packet transmitted from the data transmitter 115. For example, if the size of the packet transmitted from the data transmitter 115 is 1,500 bytes, the size of the data block that is processed by the data processor 111 may be 1 megabyte (MB).

The buffer manager 113 generates a transmission buffer pool including a plurality of buffers in a memory (not shown) of the data transmitter 110. In this case, each buffer may have the same size as that of the packet transmitted from the data transmitter 115. For example, each buffer may have the size of a maximum transmission unit (MTU) that is set in a transmission protocol between the data transmitter 110 and the data receiver 120. That is, in an embodiment of the present disclosure, each buffer belonging to the transmission buffer pool may be set to have the size of the maximum transmission unit. In this case, the maximum transmission unit has the size of 1,500 bytes. However, the present disclosure is not limited thereto, and the size may vary depending on a network environment or transmission protocol.

The buffer manager 113 may manage buffer position information indicating a position of each buffer, which is included in the transmission buffer pool, in a memory (not shown), and manage buffer use status information indicating whether each buffer is used in the memory (not shown) (that is, whether the buffer is "in-use" or "usable").

Upon receiving a buffer allocation request from the data transmitter 115, the buffer manager 113 may deliver, to the data transmitter 115, the buffer position information of buffers corresponding to a size of a storage space that is needed in the data transmitter 115. The buffer allocation request includes size information of a storage space needed by the data transmitter 115. The buffer manager 113 checks the buffer use status information of the buffers and delivers buffer position information of "usable" buffers to the data transmitter 115.

The buffer manager 113 may update the buffer use status information of a corresponding buffer according to buffer return information delivered from the data transmitter 115. The buffer return information may include buffer position information of a buffer that stores a packet that is successfully transmitted to the data receiver 120.

The data transmitter 115 converts data received from the data processor 111 into packets having a certain size, and transmits the converted packets to the data receiver 120. That is, the data transmitter 115 converts data divided into units of a data block, which is received from the data processor 111, into packets having a certain size, and transmits the converted packets to the data receiver 120. In this case, a header of each packet may include a serial number that is assigned to the packet.

The data transmitter 115 may store the converted packets in a memory (not shown) that is managed by the buffer manager 113 and then transmit the packets to the data receiver 120. The data transmitter 115 may deliver a buffer allocation request to the buffer manager 113 to receive an allocation of a storage space for storing the converted packets. The buffer allocation request includes size information of the storage space needed by the data transmitter 115. When the data transmitter 115 converts the data divided into units of a data block into the packets having a certain size, the data transmitter 115 may request the buffer manager 113 to allocate buffers in a storage space corresponding to the data block.

The data transmitter 115 may store the converted packets in corresponding buffers using the buffer position information received from the buffer manager 113. When each of the buffers belonging to the transmission buffer pool has a size of the transmission packet, the packets converted by the data transmitter 115 are stored in the respective buffers belonging to the transmission buffer pool. That is, each packet is allocated and stored in a buffer having a size corresponding to a size (herein, also referred to as a capacity) of the packet.

Figure 2:
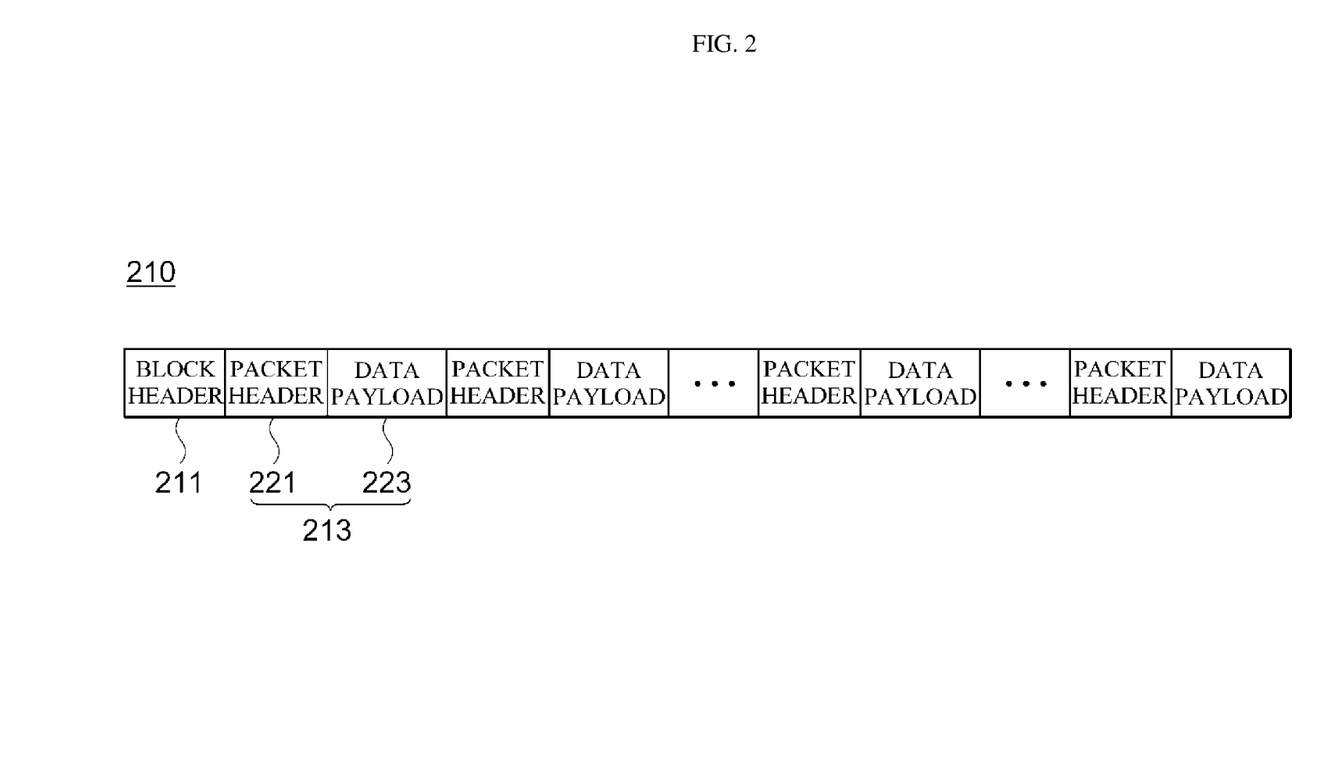
FIG. 2 is a view showing a structure of a data block that is transmitted by a data transmitter according to an embodiment of the present disclosure.

The data transmitter 115 may transmit the packets in units of a data block. FIG. 2 is a view showing a structure of the data block that is transmitted by a data transmitter 115 according to an embodiment of the present disclosure. Referring to FIG. 2, the data block 210 includes a block header 211 and a plurality of packets 213. The block header 211 may include an index (or a serial number) of the data block. In an exemplary embodiment, the data packet includes a header and a data payload. In this case, each packet 213 may be stored in a corresponding buffer belonging to the transmission buffer pool. The packet header 221 may include an index (or a serial number) of the data packet. In addition, the packet header 221 may include the number of packets in the data block.

The data transmitter 115 may identify a successfully transmitted packet through an acknowledgement message that is received from the data receiver 120 and deliver the buffer return information to the buffer manager 113 to update buffer use status information of a buffer in which the successfully transmitted packet is stored. Then, the buffer manager 113 may update a use status of the buffer from "in-use" to "usable." Another packet is stored in the buffer having a use status that is updated to "usable" and then transmitted to the data receiver 120.

That is, when the data communication system 100 transmits and receives data using the connectionless-oriented protocol, a retransmission mechanism may be used to enhance reliability of data transmission. For example, the data receiver 120 may detect a packet (that is, a lost packet) that is not received by the data receiver 120 using serial numbers of the packets and transmit a negative acknowledgement (NACK) to the data transmitter 110 in response to the detection of the lost packet to request retransmission of the lost packet. The, the data receiver 120 may transmit an acknowledgement (ACK) to the data transmitter 110 in response to reception of the packet. The data transmitter 110 may determine the successfully transmitted packet (or the lost packet) through an acknowledgement message such as a positive acknowledgement (ACK) or a negative acknowledgement (NACK). The data transmitter 115 retransmits a packet that is determined to be lost to the data receiver 120.

Figure 3A:
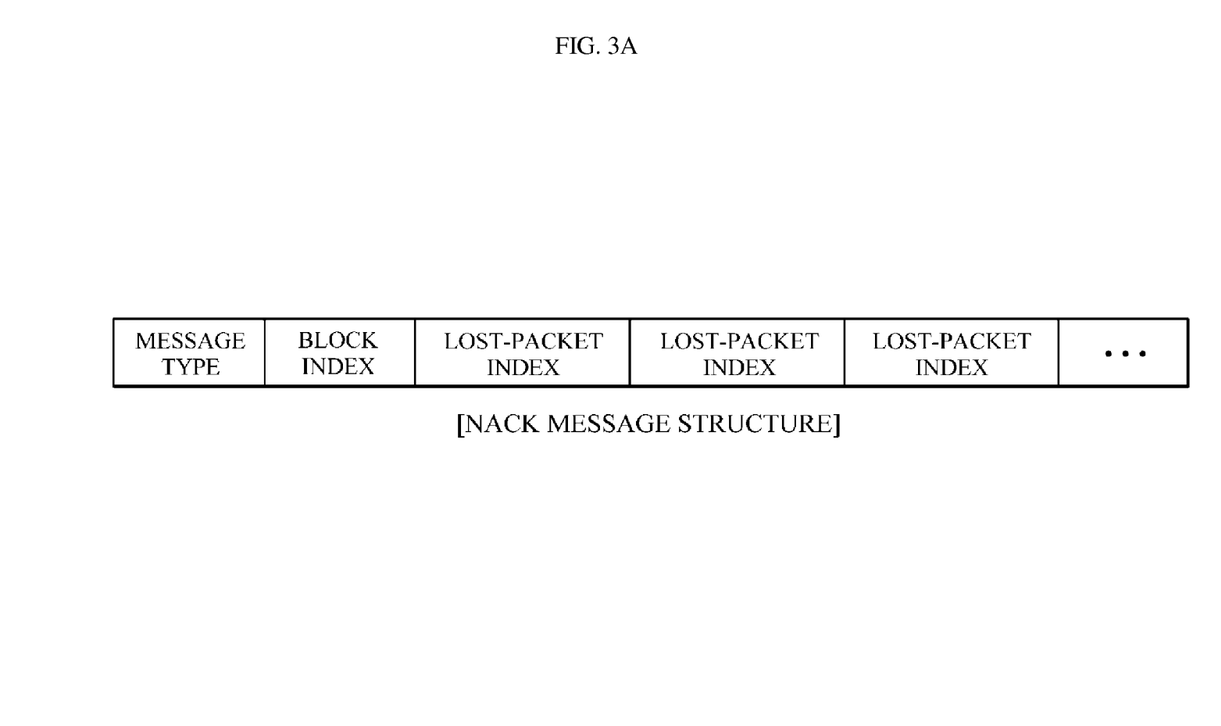
FIGS. 3A and 3B are views showing an acknowledgement message that is transmitted from a data receiver to a data transmitter according to an embodiment of the present disclosure.
Figure 3B:
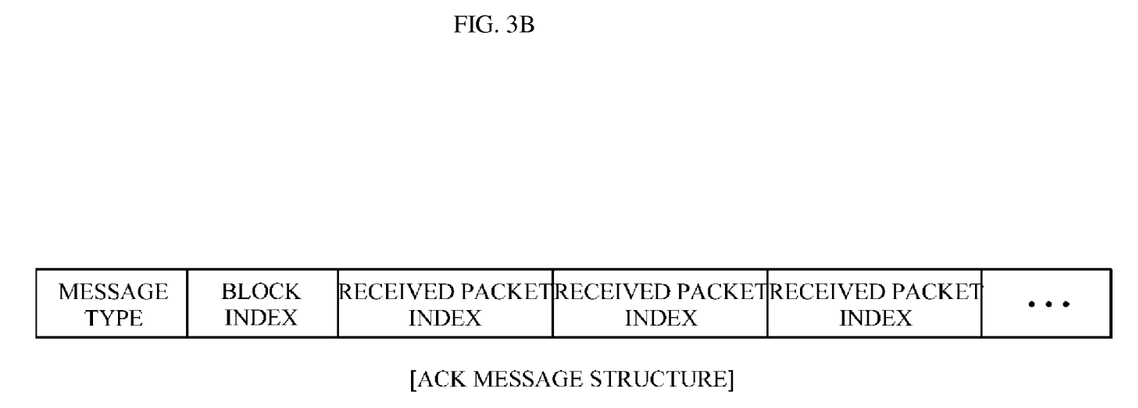

FIGS. 3A and 3B are views showing an acknowledgement message that is transmitted from a data receiver 120 to a data transmitter 110 according to an embodiment of the present disclosure.

FIG. 3A is a view showing a structure of a negative acknowledgement (NACK). Referring to the FIG. 3A, the negative acknowledgement (NACK) may include a message type, a block index, and a lost-packet index. The message type includes information (for example, information on whether the acknowledgement message is a NACK or ACK) on a type of an acknowledgement message that is transmitted from the data receiver 120 to the data transmitter 110. The block index includes an index (or a serial number) of the data block including lost packets. The lost-packet index includes a packet index (or a serial number) of each of the lost packets.

FIG. 3B is a view showing a structure of a positive acknowledgement (ACK). Referring to FIG. 3B, the positive acknowledgement may include a message type, a block index, and a received-packet index. The message type includes information on a type of the acknowledgement message that is transmitted from the data transmitter 110 to the data receiver 120. The block index includes an index (or a serial number) of the data block including received packets. The received-packet index includes a packet index (or a serial number) of each of the received packets.

It has been described that the data receiver 120 transmits information on the lost packet through the NACK or information on the received packet through the ACK. However, the present disclosure is not limited thereto, and the data receiver 120 may transmit an acknowledgement message including information on both of the lost packet and the received packet to the data transmitter 110.

According to an embodiment of the present disclosure, the transmission performance of the data transmitter 110 may be maintained at a certain level only using a transmission buffer that has a size less than that of a reception buffer of the data receiver 120, by setting each buffer belonging to the transmission buffer pool to have the size of the packet that is transmitted by the data transmitter 115 and updating buffer use status information of a buffer corresponding to a transmitted packet according to an acknowledgement message that is received from the data receiver 120. That is, even when the size of the transmission buffer of the data transmitter 110 is less than that of the reception buffer of the data receiver 120, the transmission performance may be achieved at the same level as when the size of the transmission buffer of the data transmitter 110 is equal to that of the reception buffer of the data receiver 120.

FIGS. 4 to 7 are exemplary diagrams showing a process of transmitting a packet from a data transmitter to a data receiver according to an embodiment of the present disclosure.

An embodiment will be described in which the data block has the size of 1 megabyte (MB), the transmission buffer of the data transmitter 110 has the size of 3 MB, and the reception buffer of the data receiver 120 has the size of 6 MB Here, the transmission buffer pool of the data transmitter 110 may include a plurality of buffers each having a size equal to that of the transmission packet. On the other hand, the reception buffer of the data receiver 120 includes buffers each having the size (that is, 1 MB) of the data block. For convenience of description, it has been shown that one data block corresponds to six buffers. However, the present disclosure is not limited thereto.

Figure 4:
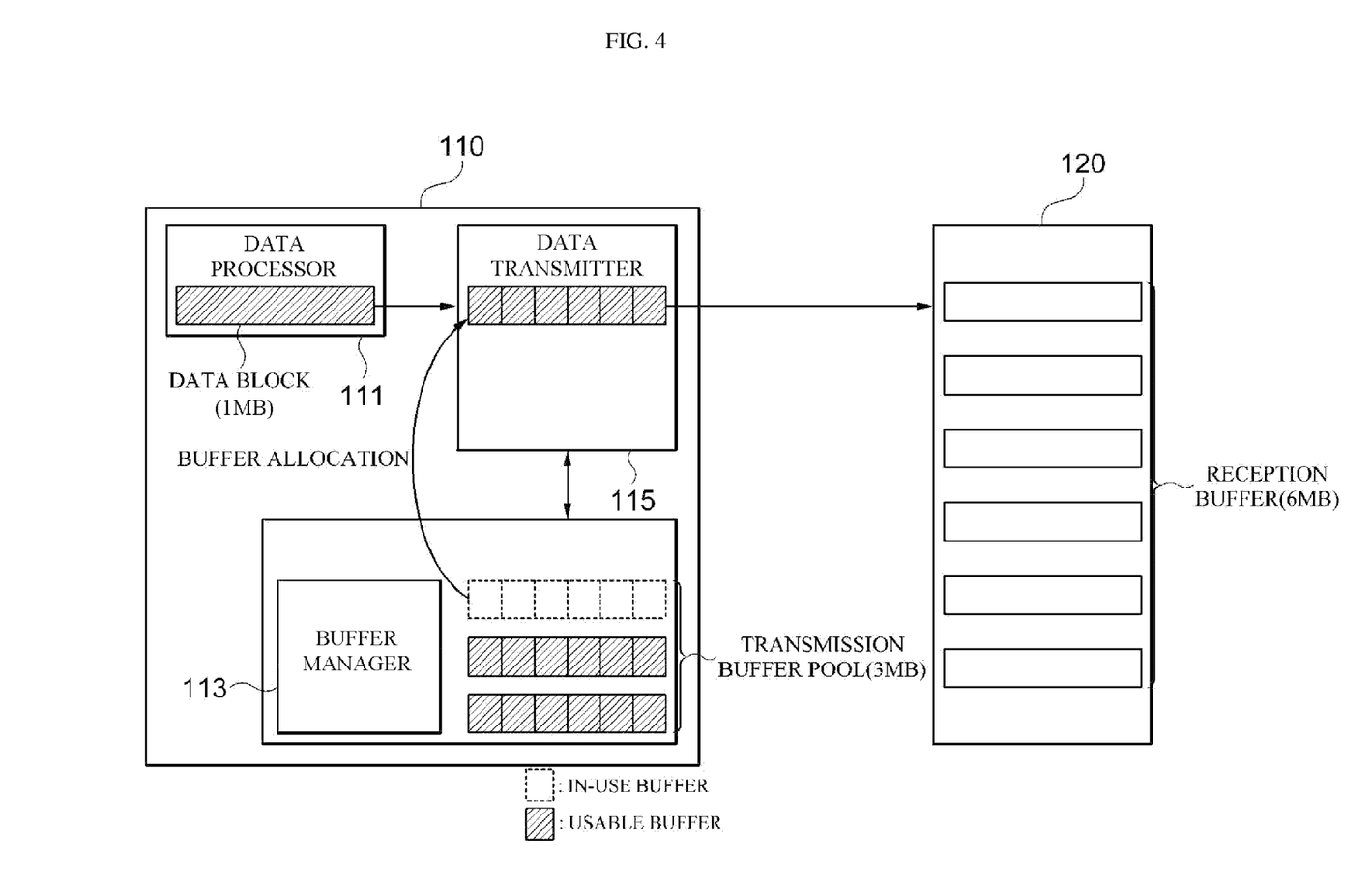
FIGS. 4 to 7 are exemplary diagrams showing a process of transmitting a packet from a data transmitter to a data receiver according to an embodiment of the present disclosure.

Referring to FIG. 4, the data processor 111 of the data transmitter 110 may read a file from a memory (not shown), divide the read file into data blocks (that is, 1 MB), and then deliver the divided data blocks to the data transmitter 115. The data transmitter 115 may convert the data blocks that are delivered from the data processor 111 into packets having a certain size and store the converted packets in respective buffers.

Specifically, the data transmitter 115 may deliver a buffer allocation request to the buffer manager 113 to receive an allocation of a storage space having the size of 1 MB. The buffer manager 113 may check the buffer use status information of the buffers in the transmission buffer pool and deliver buffer position information of "usable" buffers (having the total size of 1 MB) to the data transmitter 115. Then, the data transmitter 115 may store packets in respective buffers using the buffer position information. In this case, each buffer may have the same size as that of the packet transmitted from the data transmitter 115. Since the transmission buffer pool has the total size of 3 MB, and the data transmitter 115 is allocated 1 MB, buffers of 2 MB (that is, the size of two data blocks) are "usable" in the transmission buffer pool. Next, the data transmitter 115 may transmit the packets to the data receiver 120 in units of a data block.

Figure 5:
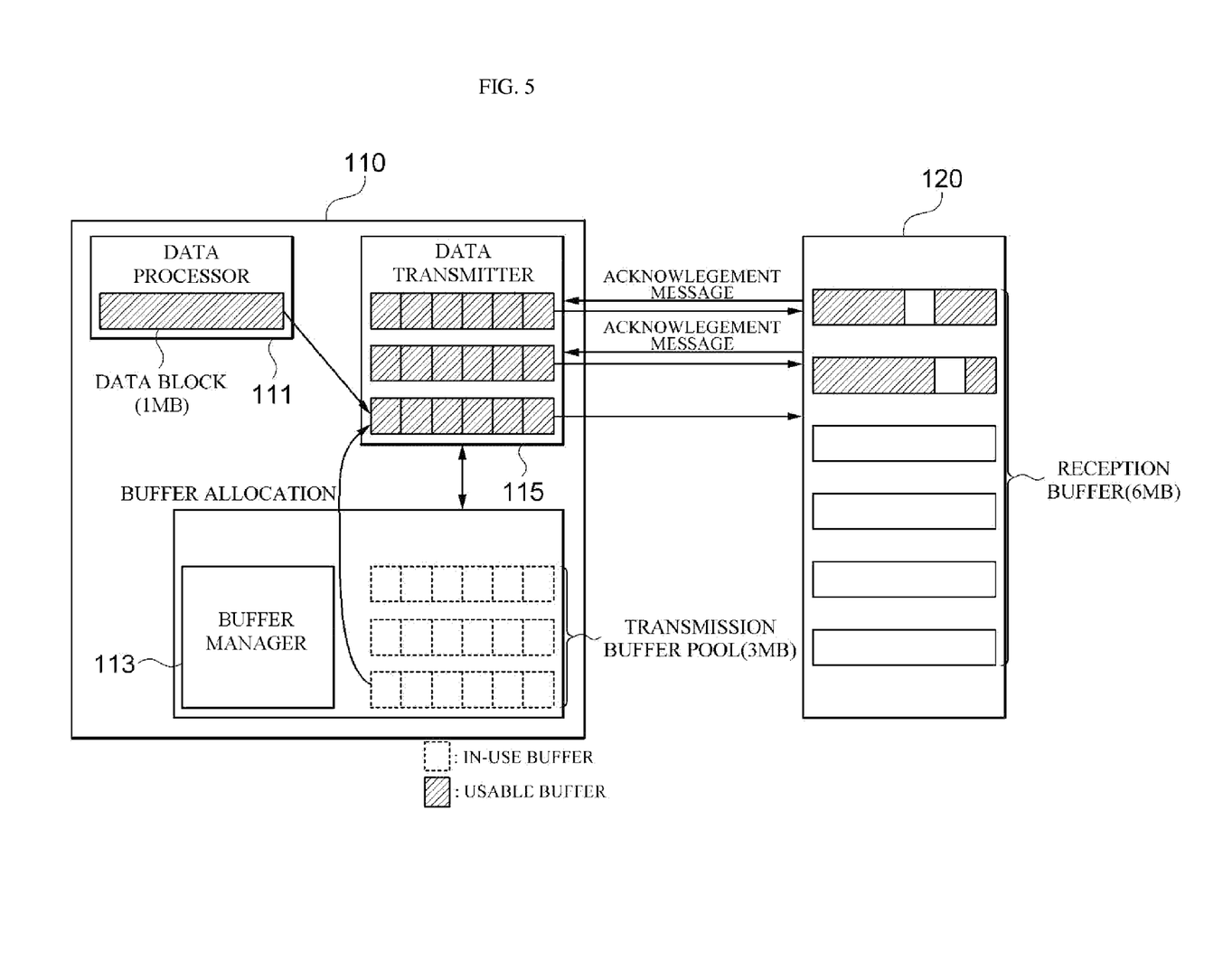

Referring to FIG. 5, when the data transmitter 115 transmits a third data block to the data receiver 120, the data transmitter 110 receives acknowledgement messages on a first data block and a second data block from the data receiver 120. That is, the data receiver 120 may transmit, to the data transmitter 110, an acknowledgement message including information on at least one of a lost packet and a received packet in each of the first data block and the second data block.

Figure 6:
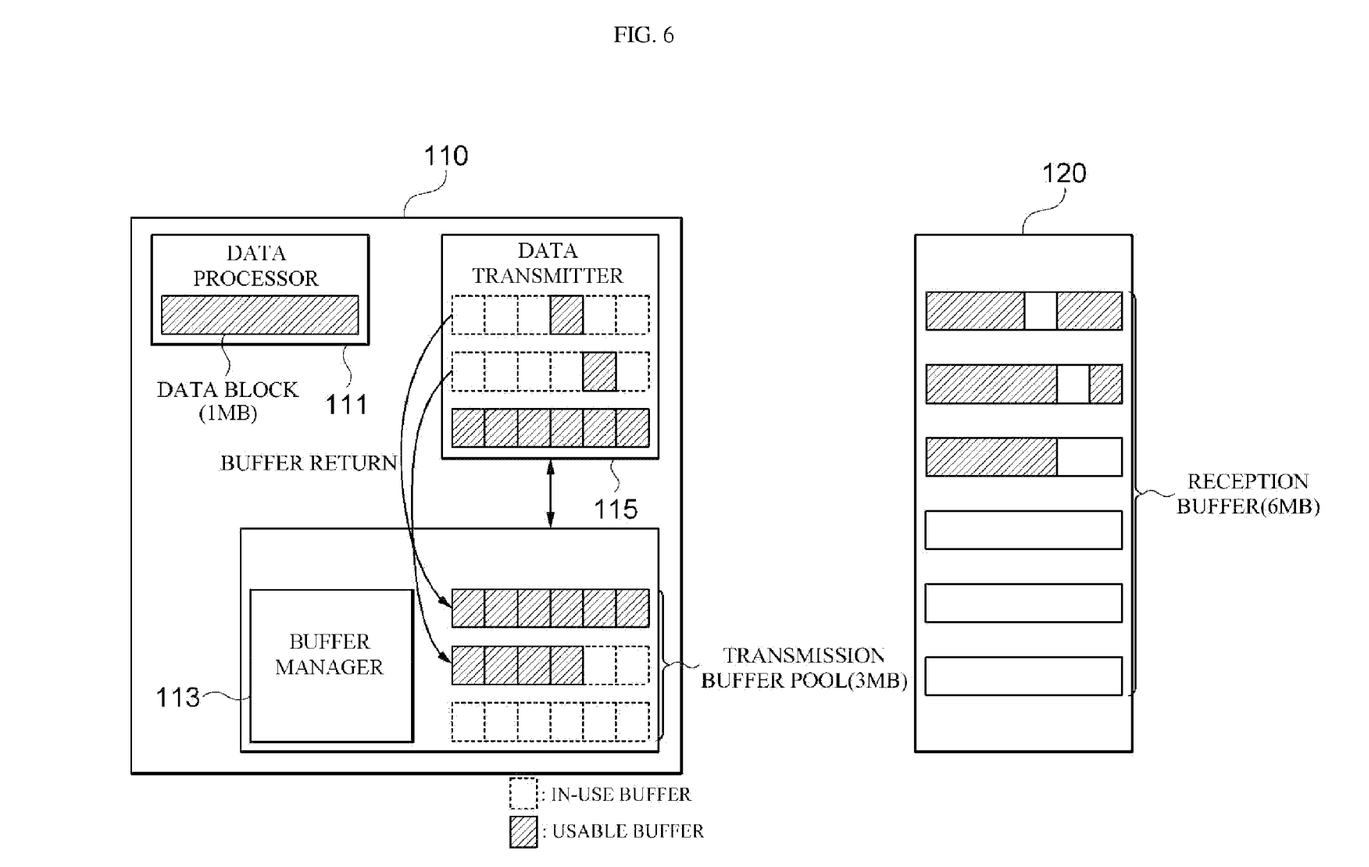

Referring to FIG. 6, the data transmitter 110 analyzes the acknowledgement messages on the first data block and the second data block to identify the lost packet and the successfully transmitted (received) packet. When the data transmitter 115 determines that a fourth packet is lost and the other packets (that is, first, second, third, fifth, and sixth packets) are transmitted as a result of analyzing the acknowledgement message for the first data block, the data transmitter 115 may deliver the buffer return information to the buffer manager 113 to return storage spaces (that is, buffers) of the transmitted packets (that is, first, second, third, fifth, and sixth packets) to the transmission buffer pool. In this case, the buffer return information may include buffer position information of buffers corresponding to the transmitted packets.

When the data transmitter 115 determines that a fifth packet is lost and the other packets (that is, first, second, third, fourth, and sixth packets) are transmitted as a result of analyzing the acknowledgement message for the second data block, the data transmitter 115 may deliver the buffer return information to the buffer manager 113 to return storage spaces (that is, buffers) of the transmitted packets (that is, first, second, third, fourth, and sixth packets) to the transmission buffer pool. In this case, the buffer return information may include buffer position information of buffers corresponding to the transmitted packets.

Then, the buffer manager 113 may update buffer use status information of buffers that are returned to the transmission buffer pool from "in-use" to "usable" using the buffer return information. Since five buffers in each of the first data block and the second data block are returned, the buffer use status information of a total of 10 buffers is updated in the transmission buffer pool. The data transmitter 115 may analyze the acknowledgement message for the third data block to determine the completed packet and the lost packet.

Figure 7:
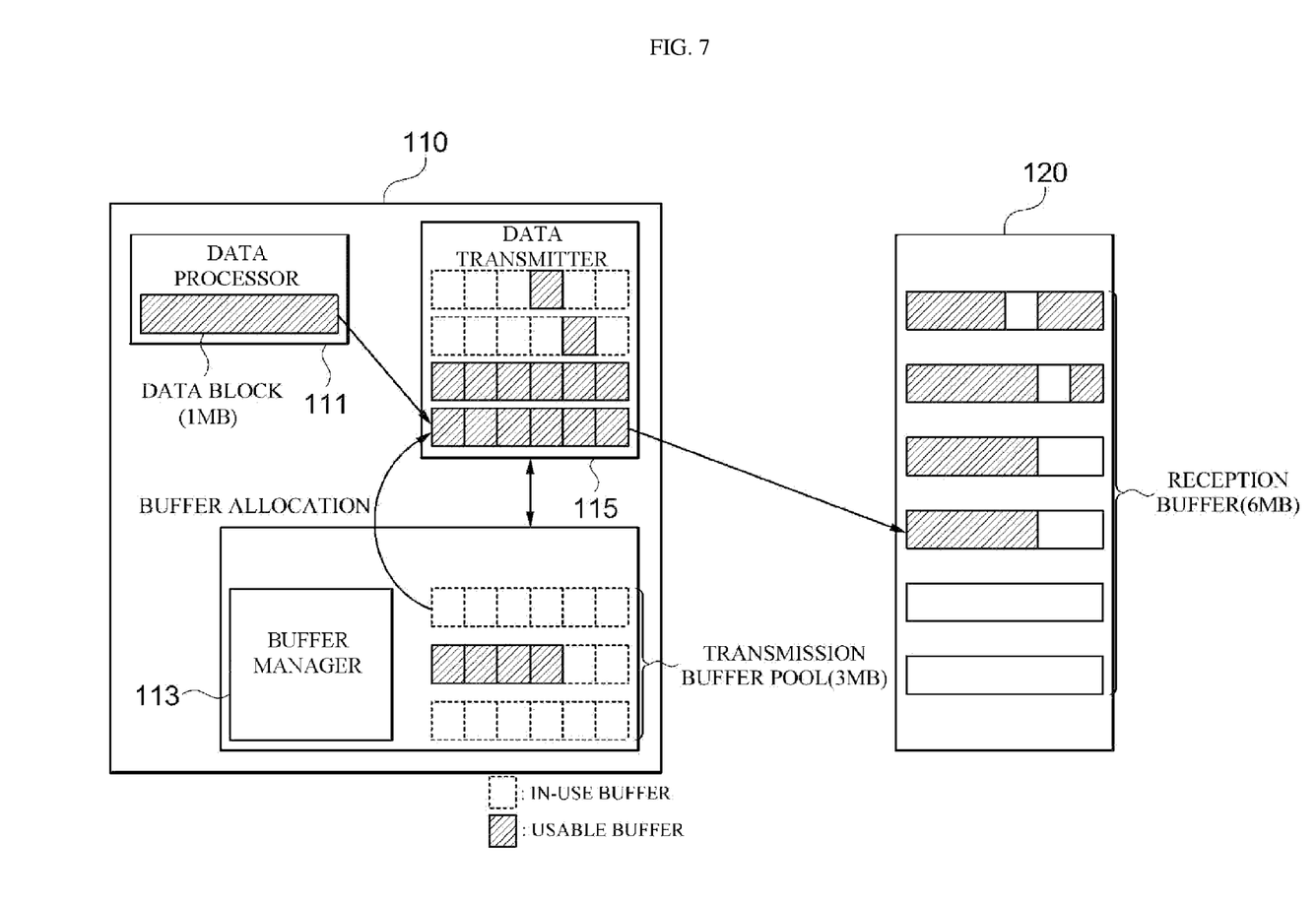

Referring to FIG. 7, when the data transmitter 115 transmits a buffer allocation request to the buffer manager 113 in order to transmit a fourth data block, the buffer manager 113 may deliver buffer position information of six buffers (that is, a storage space having a total size of 1 MB) to the data transmitter 115 because there are 10 "usable" buffers in the transmission buffer pool. Then, the data transmitter 115 may store packets of the fourth data block in respective buffers and then transmit the packets to the data receiver 120. In this case, the data transmitter 115 may transmit the fourth data block to the data receiver 120 even when the first to third data blocks are not completely transmitted.

As such, by setting respective buffers belonging to the transmission buffer pool of the data transmitter 110 to have the same size as that of the transmission packet, and by returning buffers corresponding to transmitted packets to the transmission buffer pool, data may be transmitted and received without performance degradation of data transmission even when the size of the transmission buffer pool of the data transmission is less than that of the reception buffer of the data receiver 120.

COMPARATIVE EXAMPLE

Network Environment Conditions

It is assumed that Network bandwidth: 1 Gbps, Data block size: 1 MB, Packet loss rate: 1%, Transmission packet size: 1K Byte, and Round trip time: 100 ms. If any packet is not lost, each of a data transmission side and a data reception side needs buffers having the size of about 13 MB under the network bandwidth (1 Gbps) and the round trip time (100 ms) among the network environment conditions in order for the data transmission side to receive an acknowledgement message for the first block.

Conventional Technique

Figure 8:
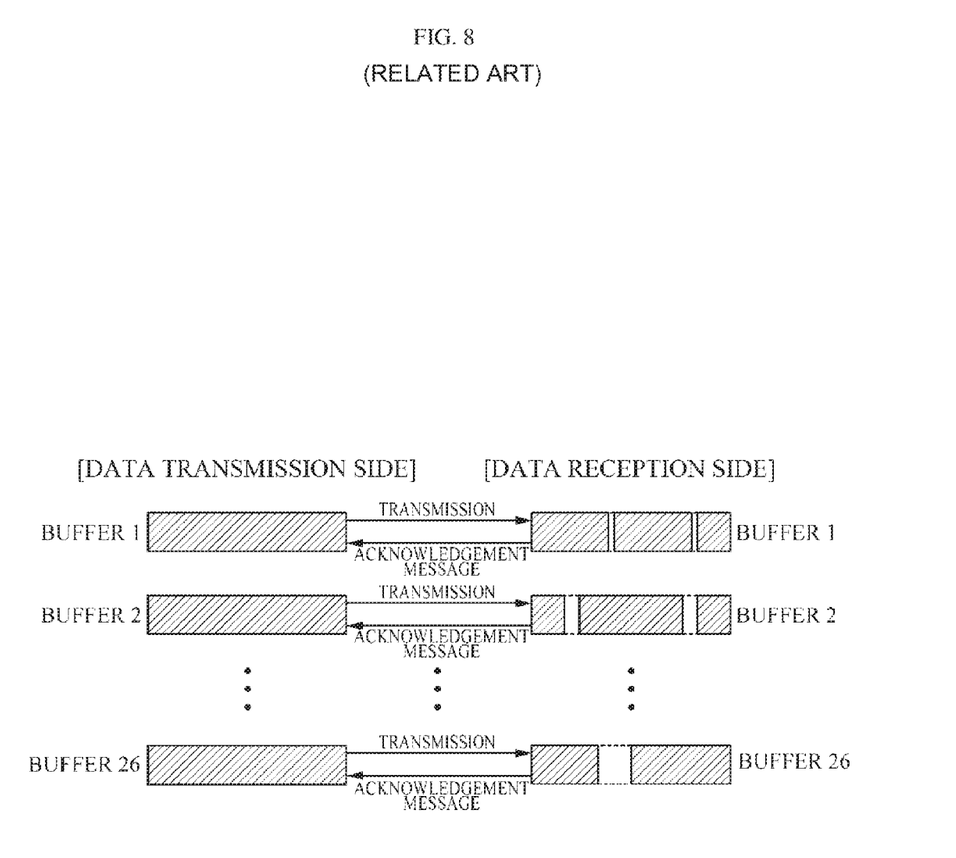
FIG. 8 is an exemplary view showing the use of a buffer in a data transmission side and a data reception side according to a conventional technique.

FIG. 8 is an exemplary view showing the use of a buffer in a data transmission side and a data reception side according to a conventional technique.

Referring to FIG. 8, the data transmission side stores data in a buffer in units of a data block and transmits the stored data. In this case, if any packet is not lost, each of the data transmission side and the data reception side requires 13 buffers each having the size of 1 MB. However, since 10 packets are lost per data block under the network environment conditions (because the data block has 1000 packets and the packet loss rate is 1%), buffers corresponding to the data block cannot be returned until the lost packets are completely transmitted.

Here, in order to return buffers corresponding to a first data block without stopping data transfer, the data transmission side needs to have extra buffers. That is, since it takes a time equal to a round trip time (RTT) to receive acknowledgement messages for the 10 packets that are lost in the first data block, the data transmission side further needs extra buffers having the size of 13 MB. As a result, the data transmission side needs buffers having the size of at least 26 MB (that is, 26 buffers each having the size of 1 MB).

Present Disclosure

Figure 9:
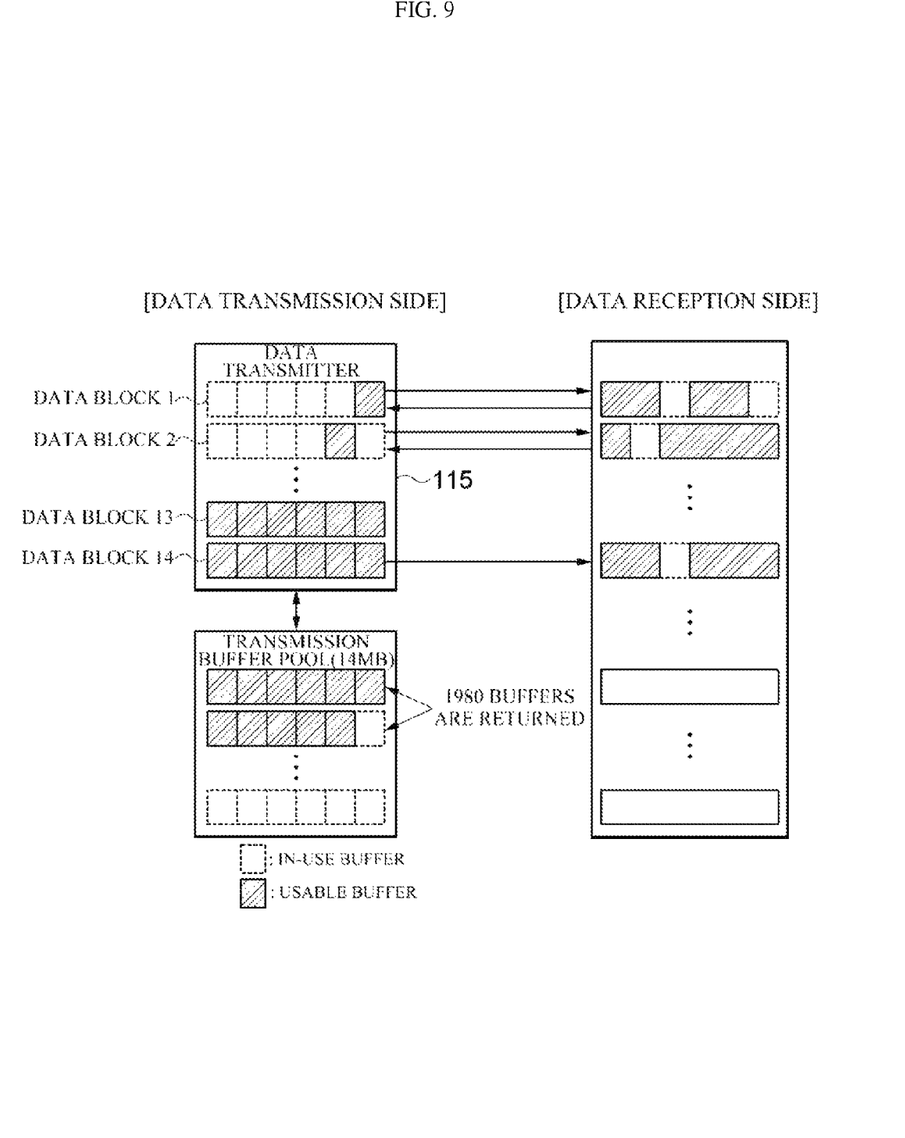
FIG. 9 is an exemplary view showing the use of a buffer in a data transmission side and a data reception side according to a conventional technique.

FIG. 9 is an exemplary view showing the use of a buffer in a data transmission side and a data reception side according to an embodiment of the present disclosure.

Referring to FIG. 9, a transmission buffer pool of the data transmission side includes buffers each having a size equal to that of the transmission packet. In this case, the transmission buffer pool is considered to have a size of 14 MB. Then, a buffer corresponding to a successfully transmitted packet is returned, and buffer use status information thereof is updated. Here, although 10 packets are lost per data block because of the packet loss rate of 1%, buffers corresponding to 990 packets may be returned to the transmission buffer pool according to acknowledgement messages of the data reception side.

Specifically, when the data transmitter 115 transmits a 13th data block, 990 buffers are returned to the transmission buffer pool according to an acknowledgement message for the first data block. Subsequently, when the data transmitter 115 transmits a 14th data block, 990 buffers are returned to the transmission buffer pool according to an acknowledgement message for the second data block. In this case, the transmission buffer pool has 1980 usable buffers.

In addition, when the data transmitter 115 intends to transmit the 15th data block, the buffer pool can allocate 1000 buffers among the 1980 buffers to the data transmitter 115. When the data transmitter 115 transmits a 15th data block, 990 buffers are returned to the transmission buffer pool according to an acknowledgement message for the third data block. Thus, the transmission buffer pool includes 1970 usable buffers and allocates 1000 buffers to transmit a 16th data block.

As such, the data transmission side needs buffers having a size of at least 26 MB according to the conventional technique. However, according to an embodiment of the present disclosure, data may be transmitted and received without degradation of data transmission performance only using a transmission buffer pool having a size of 14 MB, which is little more than half of 26 MB.

Figure 10:
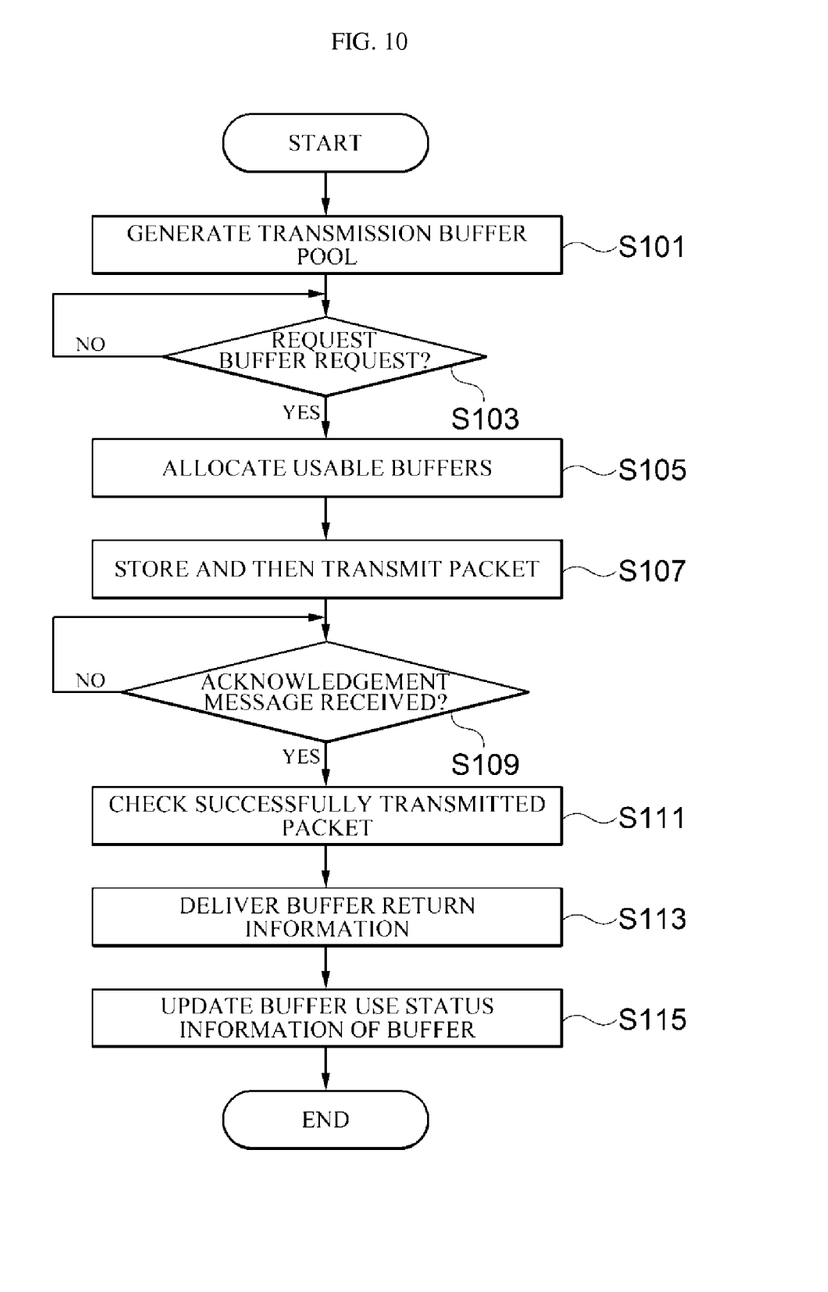
FIG. 10 is a flowchart showing a data communication method according to an embodiment of the present disclosure.

FIG. 10 is a flowchart showing a data communication method according to an embodiment of the present disclosure.

Referring to FIG. 10, the buffer manager 113 generates a transmission buffer pool including a plurality of buffers in a memory of the data transmitter 110 (S101). In this case, each buffer belonging to the transmission buffer pool may have a size equal to that of a transmission packet. The buffer manager 113 may manage buffer position information and buffer use status information of respective buffers belonging to the transmission buffer pool.

The buffer manager 113 may determine whether a buffer allocation request is received from the data transmitter 115 (S103). Upon receiving the buffer allocation request from the data transmitter 115, the buffer manager 113 may check the buffer use status information of the buffers belonging to the transmission buffer pool, transmit buffer position information of usable buffers to the data transmitter 115, and allocate the usable buffers (S105). Here, the data transmitter 115 may compare the number of data blocks that are intended to be transmitted to the data receiver 120 with the number of usable buffers in a reception buffer (that is, buffers divided into units of a data block) of the data receiver 120 and request the buffer manager 113 to allocate buffers. For example, when the number of data blocks that are intended to be transmitted to the data receiver 120 is less than the number of usable buffers in a reception buffer of the data receiver 120, the data transmitter 115 may request the buffer manager 113 to allocate buffers.

Next, the data transmitter 115 stores packets in the respective usable buffers using the buffer position information and then transmits the packets to the data receiver 120 (S107).

Next, the data transmitter 115 determines whether an acknowledgement message is received from the data receiver 120 (S109). When the acknowledgement message is determined to be received in S109, the data transmitter 115 identifies a packet (that is, a successfully transmitted packet) received by the data receiver 120 among packets transmitted to the data receiver 120 using the acknowledgement message (S111).

Next, the data transmitter 115 delivers buffer return information to the buffer manager 113 in order to return a buffer corresponding to the successfully transmitted packet to the transmission buffer pool (S113). The buffer return information may include buffer position information of the buffer corresponding to the successfully transmitted packet.

Next, the buffer manager 113 updates buffer use status information of the buffer corresponding to the successfully transmitted packet using the buffer return information (S115).

The data transmitter 110 according to an embodiment of the present disclosure receives an allocation of a buffer having a size equal to that of the transmission packet from the transmission buffer pool and returns the buffer to the transmission buffer pool, thus causing overhead. In order to reduce the overhead, a threshold value (for example, 70%) may be set for a utilization rate of the transmission buffer pool, and a buffer may be allocated and returned in units of a packet only when a utilization rate of the transmission buffer pool is greater than the threshold value.

According to an embodiment of the present disclosure, the transmission performance of the data transmitter may be maintained at a certain level only using a transmission buffer that has a size less than that of a reception buffer of the data receiver, by setting each buffer belonging to the transmission buffer pool to have the size of the packet that is transmitted by the data transmitter and updating buffer use status information of a buffer corresponding to a successfully transmitted packet according to an acknowledgement message that is received from the data receiver.

Embodiments of the present disclosure may include a computer-readable recording medium including a program for performing methods described in this specification on a computer. The computer-readable recording medium may include a program instruction, a local data file, a local data structure, or a combination thereof. The medium may be designed and configured specifically for the present disclosure or can be widely known to and used by one skilled in the art of computer software. Examples of the computer-readable recording medium include a magnetic medium, such as a hard disk, a floppy disk, and a magnetic tape, an optical recording medium, such as a CD-ROM, a DVD, etc., a magneto-optical medium such as a floptical disk, and a hardware device specially configured to store and perform a program instruction, such as a ROM, a RAM, a flash memory, etc. Examples of the program instruction include a high-level language code executable by a computer with an interpreter, in addition to a machine language code made by a compiler.

It will be apparent to those skilled in the art that various modifications can be made to the above-described exemplary embodiments of the present disclosure without departing from the spirit or scope of the disclosure. Thus, it is intended that the present disclosure covers all such modifications provided they come within the scope of the appended claims and their equivalents.

What is claimed is:

1. A data transmission apparatus comprising:
   a buffer manager configured to generate a transmission buffer pool, a capacity of the transmission buffer pool being smaller than a reception buffer capacity;
   the transmission buffer pool having buffers, each of the buffers having a buffer size based on a size of a transmission packet;
   the buffer manager being further configured to manage buffer position information and buffer use status information of the buffers;
   a data processor configured to divide data into data blocks, each of the data blocks having a predetermined data block size; and
   a data transmitter configured to convert each of the data blocks into one or more transmission packets;
   the data transmitter being further configured to generate a buffer allocation request indicating a number of the buffers, based on a number of the one or more transmission packets,
   the buffer manager being further configured to allocate ones of the buffers by providing buffer position information, of usable ones of the buffers, based on the buffer use status information and on the buffer allocation request, and
   the data transmitter being further configured to store the one or more transmission packets in accordance with the provided buffer position information and then to transmit the stored one or more transmission packets.

2. The data transmission apparatus of claim 1, wherein:
   the data transmitter is further configured to transmit the stored one or more transmission packets in accordance with a transmission protocol;
   the transmission protocol specifies a maximum transmission unit (MTU) size; and
   the buffer manager is further configured to generate the transmission buffer pool so that the buffer size equals the MTU size.

3. The data transmission apparatus of claim 1, wherein the data transmitter is further configured to be provided with an indication of a number of usable receive buffers of a reception buffer, to make a comparison between a number of the data blocks to be transmitted and the number of usable receive buffers, and to generate the buffer allocation request taking into account a result of the comparison.

4. The data transmission apparatus of claim 1, wherein the data transmitter is further configured to store the one or more transmission packets in respective ones of the buffers based on the provided buffer position information.

5. The data transmission apparatus of claim 1, wherein the data transmitter is further configured to accept an indication of a successfully transmitted packet of the one or more transmission packets, and to return to the transmission buffer pool a corresponding one of the allocated ones of the buffers.

6. The data transmission apparatus of claim 5, wherein:
   the data transmitter generates buffer return information indicating the returned corresponding one of the allocated ones of the buffers, and
   the buffer manager updates the buffer use status information based on the buffer return information.

7. The data transmission apparatus of claim 1, wherein the buffer manager is provided with an indication of the reception buffer capacity, and generates the capacity of the transmission buffer pool based on the indication.

8. The data transmission apparatus of claim 1, wherein the buffer manager is provided with a predetermined buffer utilization rate threshold value, and allocates the ones of the buffers in units of a transmission packet when the predetermined buffer utilization rate threshold value is exceeded.

9. The data transmission apparatus of claim 1, wherein the data transmitter is further configured to transmit the data using a connectionless-oriented protocol.

10. The data transmission apparatus of claim 9, wherein the connectionless-oriented protocol is a user datagram protocol (UDP).

11. A data communication method comprising:
   generating, by a buffer manager of a data transmission apparatus, a transmission buffer pool, a capacity of the transmission buffer pool being smaller than a reception buffer capacity, the transmission buffer pool having buffers, each of the buffers having a buffer size based on a size of a transmission packet;
   dividing, by a data processor of the data transmission apparatus, data into data blocks, each of the data blocks having a predetermined data block size;
   converting, by a data transmitter, each of the data blocks into one or more transmission packets;
   requesting the buffer manager to allocate a number of the buffers, based on a number of the one or more transmission packets;
   allocating, by the buffer manager, ones of the buffers by providing to the data transmitter buffer position information, of usable ones of the buffers, based on buffer use status information;
   storing, by the data transmitter, the one or more transmission packets in accordance with the provided buffer position information; and then
   transmitting, by the data transmitter, the stored one or more transmission packets.

12. The data communication method of claim 11, wherein:
   the transmitting of the stored one or more transmission packets in performed in accordance with a transmission protocol;

the transmission protocol specifies a maximum transmission unit (MTU) size; and the generating of the buffers of the transmission buffer pool is performed so that the buffer size equals the MTU size.

13. The data communication method of claim 11, wherein the requesting to allocate the number of the buffers comprises:

providing the buffer manager with an indication of a number of usable receive buffers of a reception buffer;

making a comparison between a number of the data blocks to be transmitted and the number of the usable receive buffers; and making the request for the allocating of the number of the buffers taking into account a result of the comparison.

14. The data communication method of claim 11, further comprising:

accepting an indication of a successfully transmitted packet of the one or more transmission packets; and returning to the transmission buffer pool a corresponding one of the allocated ones of the buffers.

15. The data communication method of claim 14, further comprising:

generating, by the data transmitter, buffer return information indicating the returned corresponding one of the allocated ones of the buffers; and updating, by the buffer manager, the buffer use status information based on the buffer return information.

16. The data communication method of claim 11, further comprising providing the buffer manager with an indication of the reception buffer capacity, wherein the generating of the transmission buffer pool is performed based on the indication.

17. The data communication method of claim 11, further comprising:

providing the buffer manager with a predetermined buffer utilization rate threshold value; and when the predetermined buffer utilization rate threshold value is exceeded, performing the allocating of the ones of the buffers in units of a transmission packet.

18. A computer program product comprising a non-transitory computer readable medium storing instructions adapted to enable a computer with a hardware processor to perform operations, comprising:

generating a transmission buffer pool, a capacity of the transmission buffer pool being smaller than a reception buffer capacity, the transmission buffer pool having buffers, each of the buffers having a buffer size based on a size of a transmission packet;

dividing data into data blocks, each of the data blocks having a predetermined data block size;

converting each of the data blocks into one or more transmission packets;

requesting allocation of a number of the buffers, based on a number of the one or more transmission packets;

allocating ones of the buffers by providing buffer position information, of usable ones of the buffers, based on buffer use status information;

storing the one or more transmission packets in accordance with the provided buffer position information; and transmitting the stored one or more transmission packets.

* * * * *